US009378764B2

(12) United States Patent
Trabert

(10) Patent No.: US 9,378,764 B2
(45) Date of Patent: Jun. 28, 2016

(54) METHOD AND DEVICE FOR VERIFYING A SERVO PATTERN IN TAPE MEDIA

(71) Applicant: Oracle International Corporation, Redwood City, CA (US)

(72) Inventor: Steven Gregory Trabert, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 129 days.

(21) Appl. No.: 13/802,629

(22) Filed: Mar. 13, 2013

(65) Prior Publication Data

US 2014/0269242 A1 Sep. 18, 2014

(51) Int. Cl.

| | |
|---|---|
| ***G11B 20/18*** | (2006.01) |
| ***G11B 20/06*** | (2006.01) |
| ***G11B 5/55*** | (2006.01) |
| ***G11B 15/00*** | (2006.01) |
| ***G11B 21/08*** | (2006.01) |
| ***G11B 5/584*** | (2006.01) |
| ***G11B 27/36*** | (2006.01) |

(52) U.S. Cl.

CPC ................ *G11B 20/18* (2013.01); *G11B 5/584* (2013.01); *G11B 15/005* (2013.01); *G11B 20/1816* (2013.01); *G11B 21/086* (2013.01); *G11B 21/088* (2013.01); *G11B 27/36* (2013.01)

(58) Field of Classification Search

CPC .... G11B 5/584; G11B 5/59633; G11B 27/36; G11B 5/5504; G11B 5/5508; G11B 15/005; G11B 20/1201; G11B 21/086; G11B 21/088

USPC ......... 360/77.12–77.15, 78.02, 81, 72.3, 231, 360/251–251.2, 261–261.1, 270, 271, 291, 360/241–241.3, 114.01, 130.2–130.21, 360/134; 369/13.37

See application file for complete search history.

(56) References Cited

U.S. PATENT DOCUMENTS

| | | | | |
|---|---|---|---|---|
| 4,797,754 A | | 1/1989 | Sugano | |
| 6,031,673 A | | 2/2000 | Fasen | |
| 6,320,719 B1 | * | 11/2001 | Albrecht | G11B 5/584 360/77.12 |
| 6,738,210 B1 | | 5/2004 | Olson | |
| 2004/0080846 A1 | * | 4/2004 | Nakao | G11B 27/36 360/31 |
| 2006/0007570 A1 | * | 1/2006 | Olson | G11B 5/584 360/29 |
| 2006/0126207 A1 | * | 6/2006 | Johnson | G11B 5/5963 360/48 |
| 2008/0158721 A1 | * | 7/2008 | Bui | G11B 5/584 360/77.12 |

FOREIGN PATENT DOCUMENTS

| | | |
|---|---|---|
| JP | 2003006826 A | 1/2003 |
| JP | 2003242915 A | 8/2003 |

OTHER PUBLICATIONS

International Search Report and Written Opinion for International Application No. PCT/US2014/020610 dated Sep. 8, 2014.

* cited by examiner

*Primary Examiner* — Dionne H Pendleton

(74) *Attorney, Agent, or Firm* — Brooks Kushman P.C.

(57) ABSTRACT

A system and method for verifying a servo pattern in tape media include a tape drive unit which moves the tape media lengthwise across a read head. The tape drive unit is adapted to use a tape comprising at least one servo band, each servo band including at least one servo pattern. The tape drive unit scans the read head across the servo band in a widthwise direction relative to the tape media. The system and method also include an electronic control unit that is adapted to verify the servo pattern.

18 Claims, 5 Drawing Sheets

100 L 101 101 101 W 102 102 103

METHOD AND DEVICE FOR VERIFYING A SERVO PATTERN IN TAPE MEDIA

TECHNICAL FIELD

This disclosure relates to a method and device for verifying a servo pattern in tape media.

BACKGROUND

Magnetic storage media having pre-written servo patterns are often used for storage and retrieval of data. Magnetic tape is an economical medium for storing large amounts of data, and pre-recorded servo patterns interspersed with data tracks enable higher data storage density on the tape. Magnetic tape cartridges are often used to back up large amounts of data at large computing centers. Magnetic tape cartridges also have applications in the backup of data stored on smaller computers such as personal computers.

Servo patterns are often prerecorded and verified during the tape manufacturing process. In this fashion, the servo patterns are recorded in the tape media prior to the media being used for data storage. Verification is often done by reading the servo pattern with a set of relatively narrow readers that are approximately the same width as the readers used in a tape drive. This method results in only a small fraction of the width of each of the servo bands being verified. As such, servo pattern defects that cover only a small portion of the width of the servo band may go undetected.

In an alternative verification method, a "full width" reader may be used to read the entire width of the servo band. In such a method, amplitude can be measured in an attempt to detect a defect that covers a portion of the width of the servo band. While this method does allow scanning of the full width of the servo band, this method is limited in its ability to detect narrow servo defects due to typical amplitude variation inherent in servo patterns. Furthermore, the unusually large width of the reader may preclude demodulation of the servo pattern and evaluation of many quality metrics which could detect narrow defects.

Verification of servo patterns may prevent tape cartridges with errors from being shipped to the customer. Servo pattern errors can cause permanent data errors when the customer attempts to use the defective cartridge for data storage and subsequent retrieval.

SUMMARY

A system and method for verifying a servo pattern in tape media include a tape drive unit which moves a tape lengthwise across a read head. The tape drive unit is adapted to use a tape comprising at least one servo band, each servo band including at least one servo pattern. The tape drive unit moves the read head to scan across the servo band in a widthwise direction relative to the tape. The system and method also include an electronic control unit that is adapted to verify the servo pattern.

In an embodiment of the system, the control unit is adapted to demodulate the servo pattern, and verify the demodulated servo pattern. In various embodiments of the system, verifying the demodulated servo pattern may comprise one or more of the following metrics: calculating a frame loss rate, measuring amplitude variation between peak amplitudes of the demodulated servo pattern, calculating a mean moving range of peak amplitudes of a plurality of peak amplitudes, and calculating a coefficient of variation of a plurality of peak amplitudes.

In one embodiment of the system, the read head is operably connected to a servo writer device. In some embodiments, the tape may be an optical tape.

In another embodiment, the method for verifying a servo pattern comprises moving a tape across a read head in a direction parallel to a length of the tape. The tape comprises at least one servo band, and each servo band comprises a servo pattern. The method further includes scanning the read head across the servo band in a direction parallel to a width of the tape media and reading the servo pattern. The method further includes verifying the at least one servo pattern.

In one embodiment, the method further comprises demodulating the at least one servo pattern and verifying the demodulated servo pattern. In various embodiments of the method, verifying the demodulated servo pattern may comprise one or more of the following metrics: calculating a frame loss rate, measuring amplitude variation between peak amplitudes of the demodulated servo pattern, calculating a mean moving range of peak amplitudes of a plurality of peak amplitudes, and calculating a coefficient of variation of a plurality of peak amplitudes. In one embodiment, the method includes evaluating amplitude variation of positive peaks separately from amplitude variation of negative peaks.

In another embodiment, the method comprises positioning a read head to read a servo pattern, where the servo pattern is written on a servo band that is part of an optical or magnetic tape. The method further comprises moving the tape across the read head, and scanning the read head across the servo band in a direction orthogonal to the direction of motion of the tape. The method further comprises reading and demodulating the servo pattern. The method also comprises generating a statistical analysis based on the demodulated servo pattern and verifying the servo pattern based on the statistical analysis.

In one embodiment, the tape comprises a magnetic tape. In various embodiments, generating the statistical analysis comprises generating a frame loss rate relative to cross band position or generating a coefficient of variation of a plurality of peak amplitudes relative to cross band position.

Embodiments according to the present disclosure may provide a number of advantages. For example, the present disclosure provides a system and method for detecting narrow defects in servo tracks that may not be detected by other methods. This may prevent tape cartridges with otherwise undetected defects from shipping to the customer.

The above advantages and other advantages and features of the present disclosure will be readily apparent from the following detailed description when taken in connection with the accompanying drawings.

DETAILED DESCRIPTION

Figure 1:
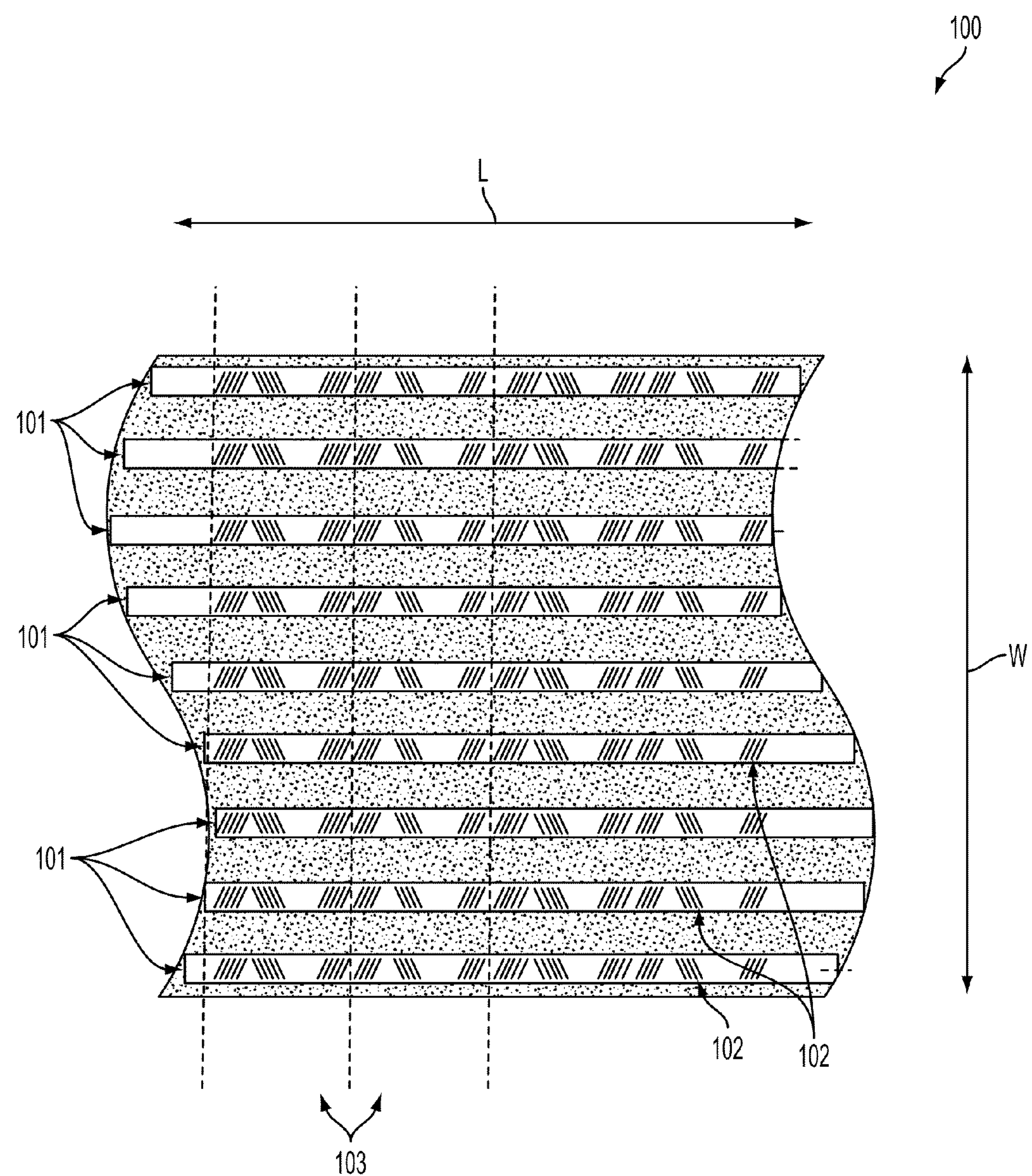
FIG. 1 illustrates a representative tape 100 as may be used in conjunction with various embodiments according to the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1-5, a system and method for verifying a servo pattern recorded in a tape medium will be described. For ease of illustration and to facilitate understanding, like reference numerals have been used herein for similar components and features throughout the drawings.

As those of ordinary skill in the art will understand, various features of the present invention as illustrated and described with reference to any of the Figures may be combined with features illustrated in one or more other Figures to produce embodiments of the preset disclosure that are not explicitly illustrated or described. The combinations of features illustrated provide representative embodiments for typical applications. However, various combinations and modifications of the features consistent with the teachings of the present disclosure may be desired for particular applications or implementations.

Data storage tape, such as is illustrated in FIG. 1 and described in more detail below, may include special prewritten bands used to precisely position the read/write heads using closed-loop feedback or servo control. As such, these bands are generally called servo bands. A servo band may include a plurality of servo tracks positioned within the servo band. The servo band may be read by corresponding servo readers on the read heads, allowing the read/write head to position to the desired tracks and stay on track during any unexpected lateral tape motion as the tape moves through the tape path. The area between servo bands is utilized for data storage, and may contain a large number of data tracks. For example, a representative magnetic tape may include eight (8) data bands with nine (9) servo bands arranged in an alternating fashion. Each data band may include multiple data tracks, such as 448 tracks. Similarly, each servo band may include multiple positions for reading the servo pattern.

Sometimes servo patterns are not written properly during the manufacturing process. When such an error occurs, the improperly written servo patterns may not adequately enable identification of locations on the tape medium. As a result of improperly written servo patterns, the tape may be of inferior quality in terms of its data storage capabilities. Improperly written servo patterns can even result in a defective or unusable product. Errors in servo writing may be caused by the collection of dust or debris on servo writing components. The debris may clog gaps in the servo write head, or cause the height of the tape media relative to the write head to change. In either case, write errors may occur which can degrade the signal that is written to the media. Errors in servo writing may also be caused by corrosion of the servo write head. Write heads used in conjunction with timing based servo patterns include two or more gaps in the servo write head, and corrosion of one gap leads to peak amplitude variation errors.

As previously described, a prior art servo pattern verification method includes the use of relatively narrow readers that are approximately the same width as the readers used in a tape drive. In such a method, the readers are implemented in a generally constant position relative to the servo band, and thus read and verify only a small fraction of the width of the servo band. As such, methods with fixed narrow readers cannot detect servo defects that are not positioned on the verified portion of the servo band. In an alternative method, a wide reader may be used to read the entire width of a servo band. Such a reader may lack the precision to demodulate the servo pattern, but it may be used to measure amplitude in an attempt to detect defects that cover only a portion of the width of the servo band. However, this method is limited in its ability to detect narrow servo defects due to normal amplitude variations.

While various representative embodiments are described with reference to a timing-based servo pattern, the systems and methods described are not limited to use with timing-based servo patterns. For example, tape media including amplitude-based servo patterns could also be verified using a similar scanning strategy as described with reference to the timing-based servo patterns.

As used herein, demodulation may include extracting a transverse media location from a servo pattern. Various metrics described herein, including frame loss rate and peak amplitude variation measurements, may also be evaluated based on a "partial demodulation" of servo patterns, during which the relevant information may be extracted from a servo pattern without fully extracting a transverse media location.

Referring now to FIG. 1, a representative tape media 100 as may be used in conjunction with a system or method for servo pattern verification according to the present disclosure is shown. In an exemplary embodiment, the tape media 100 comprises a magnetic tape. Tape media 100 has a length L and a width W stretching from respective ends of the tape media 100. The tape media 100 comprises a plurality of servo bands 101. As an example, the tape media may comprise nine servo bands 101. Each of the servo bands 101 may comprise a servo pattern 102. Each of the servo patterns 102 may comprise a plurality of frames 103.

Figure 2:
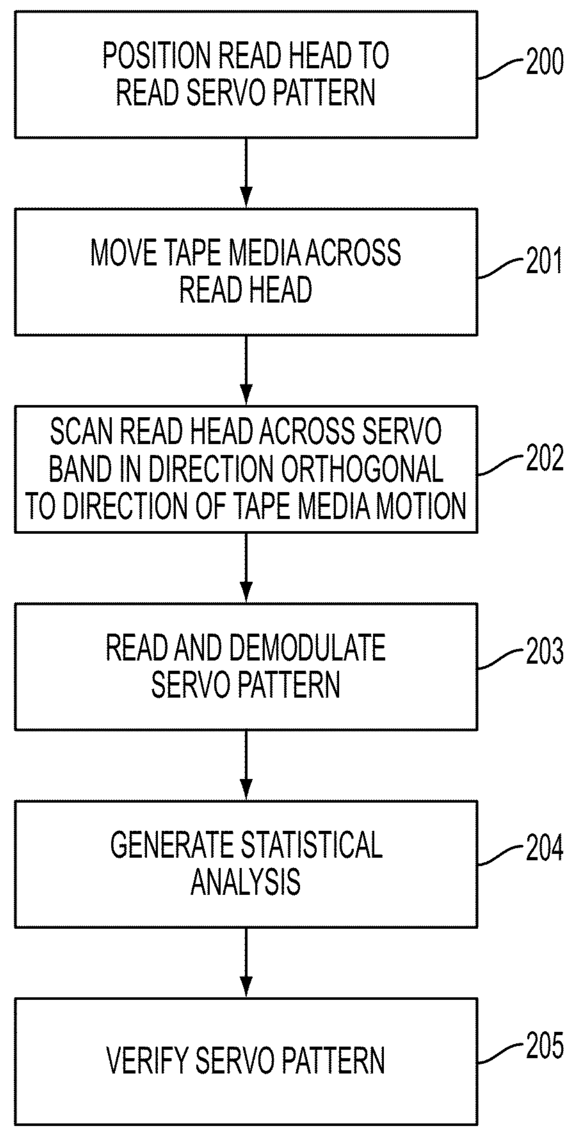
FIG. 2 is a flow chart illustrating operation of a system or method for verifying a servo pattern according to one embodiment of the present disclosure.

Referring now to FIG. 2, a flowchart illustrating operation of a system or method for verifying a servo pattern is shown. The system or method may include positioning a read head to read a servo pattern, as represented by block 200. The servo pattern may be written on a servo band of an optical or magnetic tape as shown in FIG. 1. The system or method may also include moving the tape across the read head, as represented by block 201. The method additionally includes scanning or moving the read head across a width of the servo band in a direction generally orthogonal to the direction of motion of the tape, as represented by block 202. The system or method may also include reading and demodulating the servo pattern, as represented by block 203. The system or method may also include generating a statistical analysis of the demodulated servo pattern, as represented by block 204. The system or method may also include verifying the servo pattern based on one or more statistical analyses of the servo pattern relative to cross band position, as represented by block 205.

Figure 3:
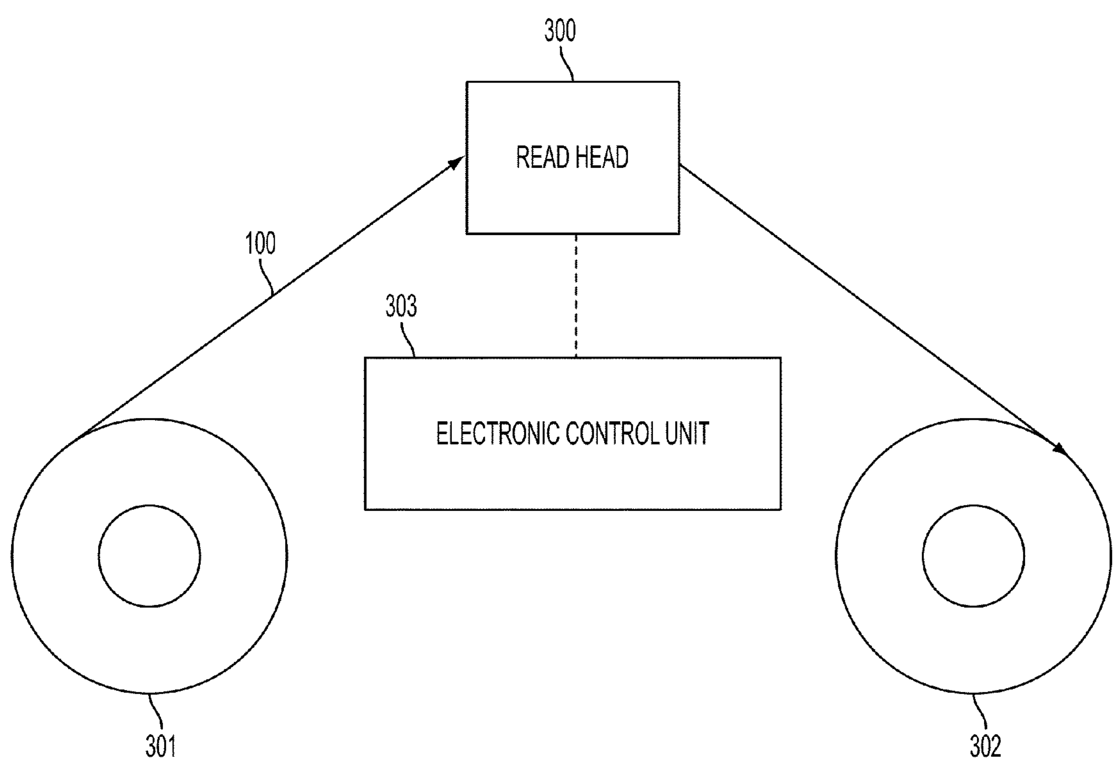
FIG. 3 is a simplified schematic illustrating an embodiment of a system for verifying a servo pattern according to the present disclosure.

Referring now to FIG. 3, a schematic view of a system for verifying a servo pattern is shown. The tape media 100 may be supplied on supply reel 301 and can be transferred to a take-up reel 302 by servo action of at least one reel drive motor (not shown). The reel drive motor(s) may act to provide smooth movement of the tape 100 along the tape path and move the tape in a generally linear fashion during loading and/or unloading as well as during reading and/or writing of data or servo patterns. The system also includes a read head 300 configured to read the tape media 100.

In contrast to prior art solutions, which employ either a wide read head or a fixed narrow read head, the read head 300 comprises a narrow reader that is configured to scan across the servo bands 101 in a width-wise direction. An electronic control unit 303 is operatively connected to the read head 300, as shown by the dashed line. The electronic control unit 303 may be configured to demodulate the servo pattern read by the read head 300. The movement of the read head 300 across the tape width is slow relative to the length of the frames 103, to enable such demodulation of the servo patterns. The electronic control unit 303 may be further configured to generate statistical analyses of the demodulated servo patterns, as will be discussed in further detail with reference to FIGS. 5*a*-5*d*. As will be apparent to one skilled in the art, the above need not be performed by a single controller, but could instead be performed by multiple control units or computers working in combination.

Figure 4:
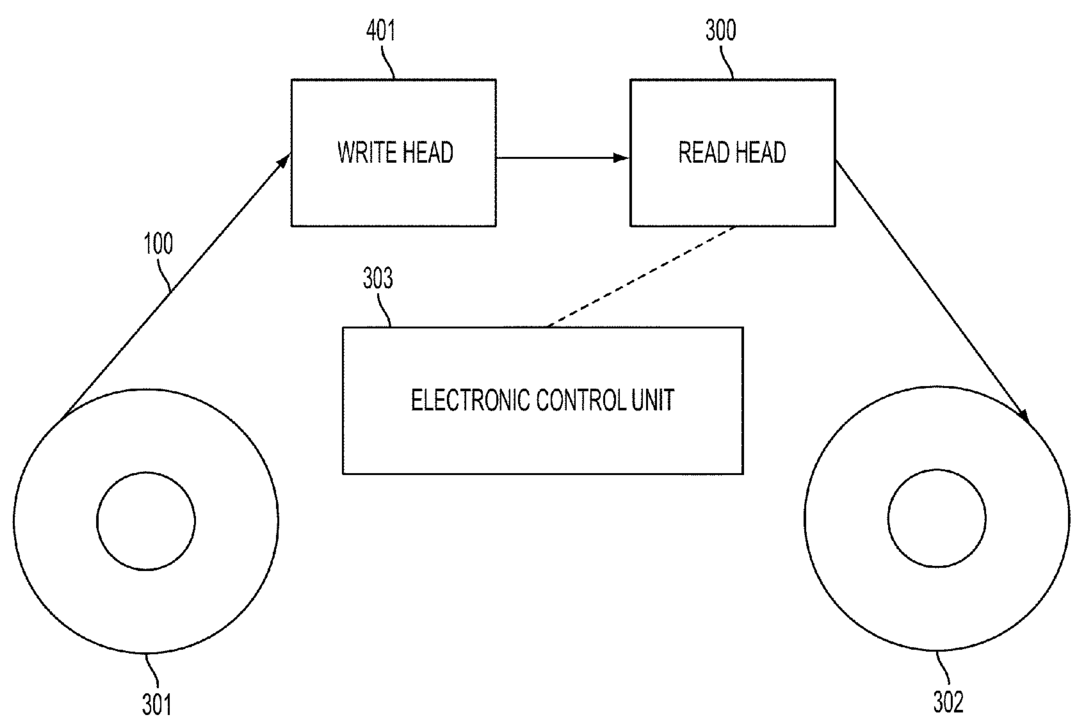
FIG. 4 is a simplified schematic illustrating an alternative embodiment of a system for verifying a servo pattern according to the present disclosure; and FIGS. **5*a*-5*d*** illustrated representative statistical analyses based on servo pattern signals relative to cross band position as may be used to verify a servo pattern according to various embodiments of the present disclosure.

Referring now to FIG. 4, another embodiment of a system for verifying a servo pattern is shown. In this embodiment, the system is incorporated into a servo writer device. In this embodiment, the system comprises write head 401, which is operably connected to read head 300. Write head 401 is configured to write servo patterns 102 onto tape media 100. Such a combined system may be advantageous in some manufacturing environments.

Referring now to FIGS. 5*a*-5*d*, exemplary statistical analyses of the demodulated servo patterns relative to cross-band position are shown. In the representative embodiment illustrated, a magnetic tape having nine (9) servo bands numbered 0-8 are positioned across a width of the tape. Each servo band is about 74 μm wide. However, the narrow servo element associated with each servo band is only about 2 μm wide. As such, the servo element may have multiple cross-band positions within an associated servo band as generally represented in the statistical analyses of FIGS. 5*a*-5*d*. The cross-band position may be measured from either edge of a particular servo band, or may be measured from the center of the servo band as shown in FIGS. 5*a*-5*d*. For example, the cross-band position of 0 μm corresponds to the center of each servo band. Because the read head width of about 2 μm approximates that used in tape drives, existing quality metrics may be used. To enhance the sensitivity to cross band defects, meaning those defects which persist along a length of the tape within a direction perpendicular to that of tape motion, the various metrics may be evaluated as a function of cross band position. Thus, each servo band is evaluated by scanning the 2 μm servo element across a substantial portion of the width of the servo band.

Figure 5A:
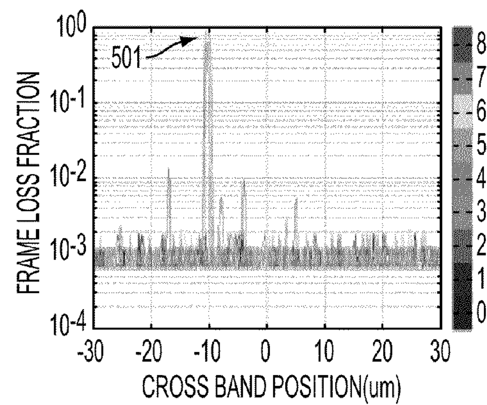
Figure 5B:
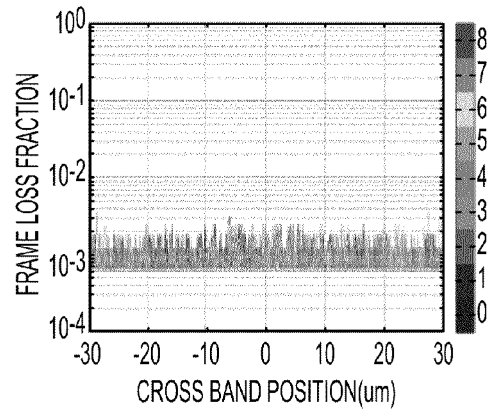

One metric that may be evaluated is the frame loss rate or fraction. FIG. 5*a* shows an exemplary plot of frame loss fraction relative to cross band position for each of the nine servo bands. High frame loss rates, as can be seen at, for example, point 501, indicate a defect in the servo pattern corresponding to servo band eight in this example. As shown in FIG. 5*a*, the highest frame loss fraction 501 occurs about 10 μm from the center of the servo band. Frame loss fractions that appear significantly higher for servo band seven as compared with the other servo bands also occur at about −18 μm, −8 μm, −5 μm, and +5 μm. FIG. 5*b* shows a frame loss fraction relative to cross band position for a tape which contains no detectable servo pattern errors as indicated by the generally consistent frame loss rate at all cross band positions for all evaluated servo bands.

Figure 5C:
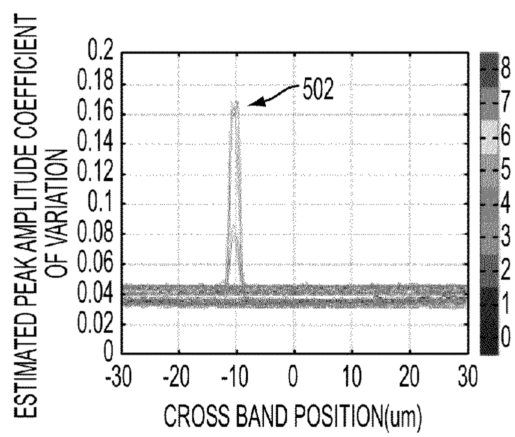
Figure 5D:
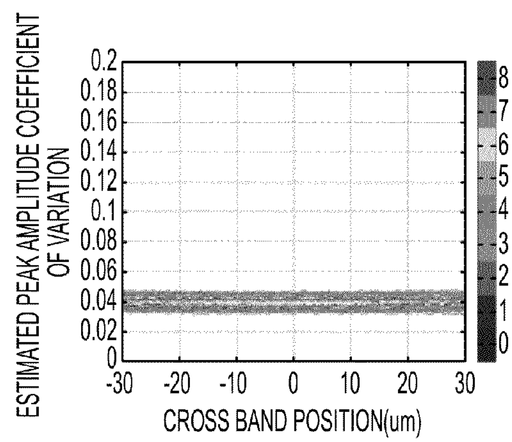

Another metric that may be evaluated to defect defects in the servo patterns is a measure of amplitude variation between peak amplitudes of the servo read signal. This metric may be evaluated separately for positive and negative peaks, as some defects affect one polarity more than the other. One amplitude variation metric that may be evaluated is the coefficient of variation of the peak amplitudes. FIG. 5*c* shows an exemplary plot of coefficient of variation of peak amplitudes relative to cross band position. A high coefficient of variation, as can be seen at, for example, point 502, indicates the presence of a defect in the servo pattern. FIG. 5*d* shows a coefficient of variation as a function of cross band position for a tape media which contains no detectable servo pattern errors in any of the bands or positions analyzed. The generally consistent peak amplitude coefficient of variation at all cross band positions for all evaluated bands indicates that no defects are present.

Other amplitude variation metrics that may be used to evaluate whether defects are present include the mean moving range of peak amplitudes of a set of peaks, and the standard deviation of peak amplitudes. Various other metrics known to those skilled in the art may also be implemented to evaluate whether servo pattern errors or defects are present.

As can be seen from the various embodiments, the systems and methods for verifying a servo pattern according to the present disclosure may provide associated advantages relative to prior art implementations. For example, the present disclosure provides a system and method for detecting narrow defects in servo tracks that may not be detected by other methods. This prevents tape cartridges with undetected defects from shipping to the customer, and avoids costly recalls.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for verifying a servo pattern in tape media, the method comprising:

moving the tape media across a read head in a direction parallel to a length of the tape media, the tape media comprising at least one servo band, each of the at least one servo band comprising a servo pattern;

scanning the read head across the entire servo band in a direction parallel to a width of the tape media and reading the at least one servo pattern; and verifying the at least one servo pattern by demodulating the at least one servo pattern and calculating at least one of a mean moving range of peak amplitudes of a plurality of peak amplitudes of the at least one demodulated servo pattern and a standard deviation of a plurality of peak amplitudes of the at least one demodulated servo pattern.

2. The method of claim 1, wherein the verifying of the at least one servo pattern further comprises verifying the at least one demodulated servo pattern based on signal properties as a function of cross-band position within the at least one servo band.

3. The method of claim 2, wherein each of the at least one servo pattern comprises a plurality of frames, and wherein the verifying of the at least one demodulated servo pattern further comprises calculating a frame loss rate.

4. The method of claim 2, wherein the verification of the at least one demodulated servo pattern includes evaluating at least one statistical metric as a function of cross band position.

5. The method of claim 2, wherein the verification of the at least one demodulated servo pattern further comprises measuring amplitude variation between peak amplitudes of the at least one demodulated servo pattern.

6. The method of claim 5, wherein the verification of the at least one demodulated servo pattern further comprises evaluating amplitude variation of positive peaks separately from amplitude variation of negative peaks.

7. The method of claim 5, wherein the verification of the at least one demodulated servo pattern further comprises calculating a coefficient of variation of a plurality of peak amplitudes of the demodulated servo patterns.

8. A system for verifying a servo pattern on tape media, the system comprising:

a tape drive unit adapted to move the tape media in a direction parallel to a length of the tape media, the tape media comprising at least one servo band, each of the at least one servo band comprising a servo pattern;

a read head adapted to scan from edge to edge across a width of the servo band in a direction parallel to a width of the tape media; and an electronic control unit adapted to verify the at least one servo pattern based on signal parameters as the read head scans across the width of the servo band.

9. The system of claim 8, further comprising a servo writer device, and wherein the read head is operably connected to the servo writer device.

10. The system of claim 8, wherein the verification of the at least one servo pattern by the electronic control unit includes evaluating at least one statistical metric as a function of cross band position.

11. The system of claim 8, wherein the control unit is further adapted to demodulate the at least one servo pattern, and wherein the verifying of the at least one servo pattern comprises verifying the at least one demodulated servo pattern.

12. The system of claim 11, wherein the verification of the at least one demodulated servo pattern comprises measuring amplitude variation between peak amplitudes of the at least one demodulated servo pattern.

13. The system of claim 12, wherein the verification of the at least one demodulated servo pattern further comprises calculating a mean moving range of peak amplitudes of a plurality of peak amplitudes of the at least one demodulated servo pattern.

14. The system of claim 12, wherein the verification of the demodulated servo patterns further comprises calculating a coefficient of variation of a plurality of peak amplitudes of the at least one demodulated servo pattern.

15. A method for verifying a servo pattern, the method comprising:

positioning a read head to read a servo pattern, the servo pattern being written on a servo band contained in a tape;

moving the tape across the read head;

scanning the read head back and forth across an entire width of the servo band in a direction orthogonal to the direction of motion of the tape;

reading and demodulating the servo pattern;

generating a statistical analysis based on the demodulated servo pattern as a function of cross-band position; and verifying the servo pattern based on the statistical analysis.

16. The method of claim 15, wherein generating the statistical analysis includes evaluating at least one statistical metric as a function of cross band position.

17. The method of claim 15, wherein generating the statistical analysis includes generating a frame loss rate.

18. The method of claim 15, wherein generating the statistical analysis includes generating a coefficient of variation of a plurality of peak amplitudes.

* * * * *